July 6, 1937.   R. E. ZERUNEITH   2,085,780
METHOD OF MAKING FROZEN STRIPS OF WIRE STAPLES
Original Filed March 10, 1932   2 Sheets-Sheet 1

Inventor
RUDOLPH E. ZERUNEITH
Leonard L. Kalish
Attorney

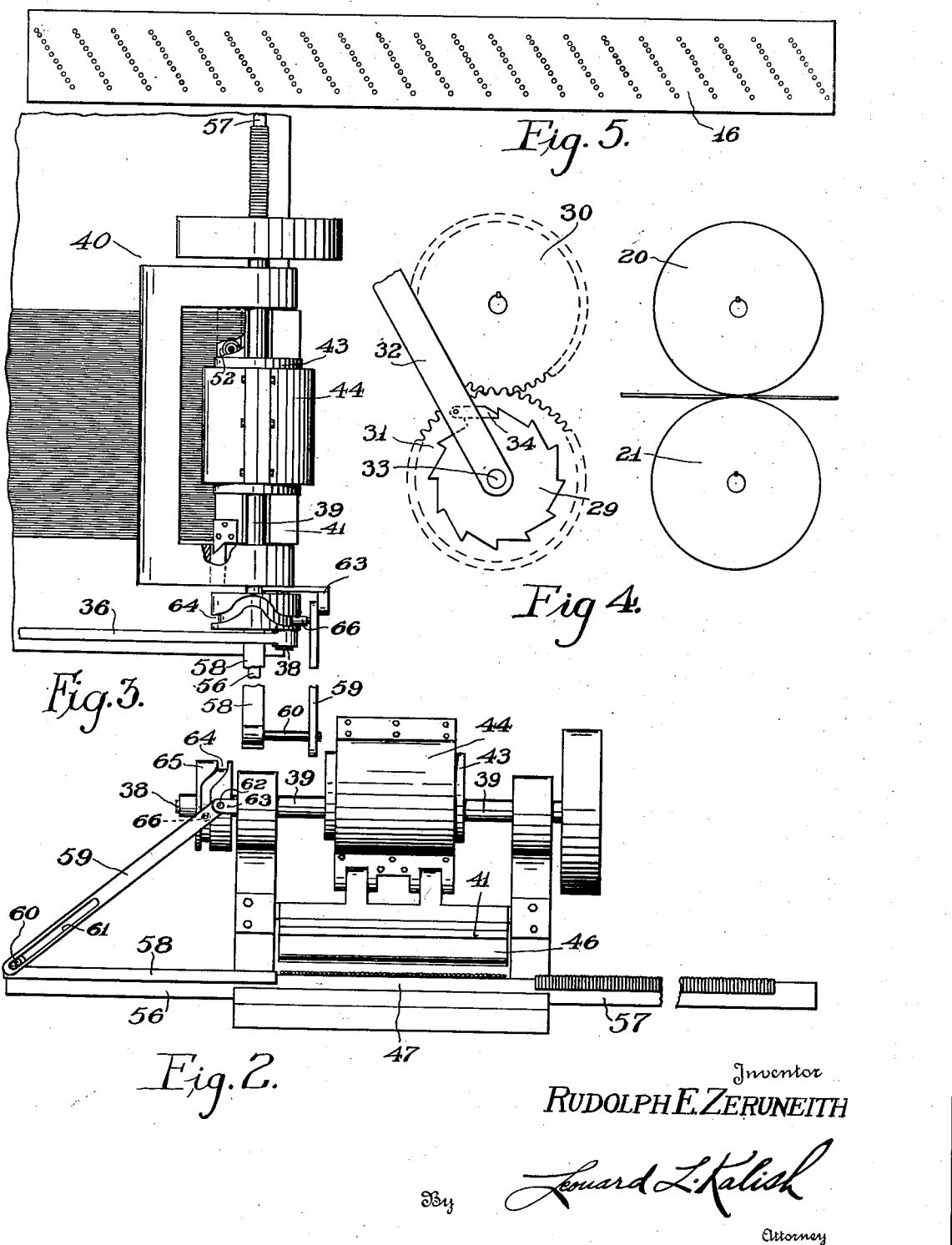

Patented July 6, 1937

2,085,780

UNITED STATES PATENT OFFICE 2,085,780

METHOD OF MAKING FROZEN STRIPS OF WIRE STAPLES

Rudolph E. Zeruneith, Camden, N. J.

Application March 10, 1932, Serial No. 598,062
Renewed July 15, 1935

16 Claims. (Cl. 59—77)

My invention relates to a new and useful method of making frozen wire staples, that is, wire staples which have been fastened to each other by some adhesive so as to form a row or "bar" or "strip" of aligned staples for use in stapling machines. My invention may also be applied, however, to the formation or manufacture of cohered "strips" or "bars" of other formed wire devices, similar to staples, as for instance, hairpins and the like.

My invention relates more particularly to a novel method of making staples whereby an entire "strip" of frozen wire staples (as for instance, a strip of 210 staples or any other suitable number of staples) may be formed with a single cutting and forming operation of a forming die.

One of the objects of my invention is to facilitate the production of "strips" of frozen wire staples and to reduce the cost of production thereof, and at the same time to provide a more uniform and better product.

With the above and other objects in view, which will appear more fully from the following detailed description, my invention consists in simultaneously feeding a multiplicity (210 or any other suitable number) of wires, from a like number of supply reels, spools, or the like, through guiding means which will position the wires in close proximity to each other, then through feed rolls which grip all the wires and through which the wires are fed in contiguous and adjacent relation to each other, and then feeding the multiplicity of wires to cutting means for severing a suitable length of said multiplicity of wires, and forming means for simultaneously forming the multiplicity of staples from the multiplicity of cut wires, and applying a suitable adhesive or cohesive material to the multiplicity of wires between the supply reels, spools, or the like, from which said wires issue, and the wire cutting and staple forming means, so as to cause said multiplicity of wires to adhere to each other before they are cut and formed into staples.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings, in which like reference characters indicate like parts:

Figure 2 represents a front elevational view of the cutting and forming means.

Figure 3 represents a top view of the same.

Figure 4 represents a side elevational view, on an enlarged scale, of several of the feed rolls.

Figure 5 represents a front elevational view of the wire spacing plate or wire guide plate.

Figure 1:
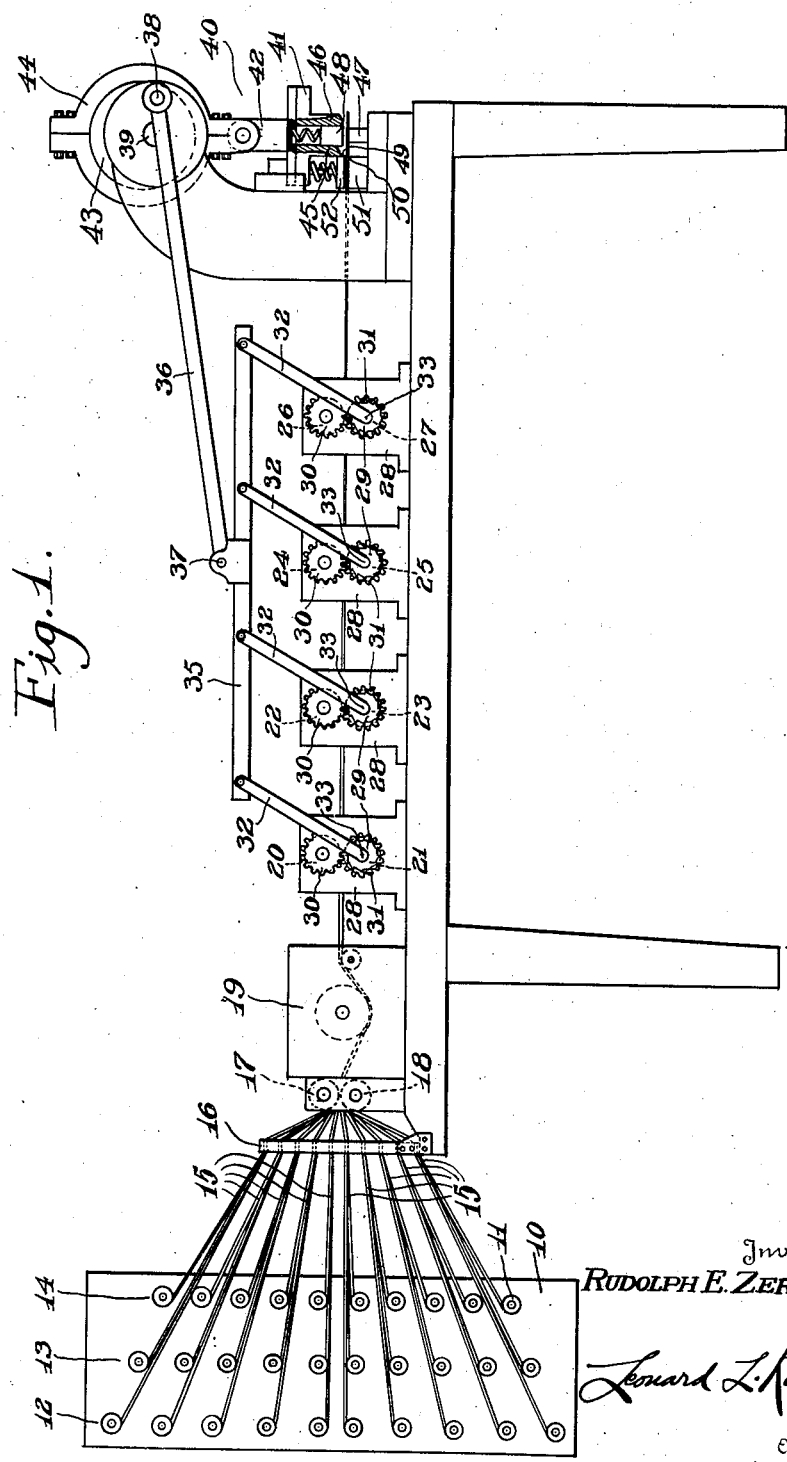
Figure 1 represents a diagrammatic side elevational view illustrating the general form of apparatus (without reference to details) which may be used for carrying out my novel method or process.

In carrying out my invention, I provide any suitable spool or reel rack 10, shown diagrammatically in Figure 1, on which are rotatably mounted the required number of wire supply reels or spools or the like designated by the numeral 11. These supply reels, spools or the like, are mounted on suitable pins, spindles, or shafts, so that they may rotate as the wire is drawn therefrom. In the particular illustration shown in the drawings, a strip or bar of frozen wire staples containing two hundred and ten (210) staples is contemplated, and the reel rack 10 therefor contains two hundred and ten (210) reels or spools of wire. The reels or spools, for convenience, are arranged in three vertical planes 12, 13 and 14, extending generally transversely of the direction of travel of the wires, each plane containing ten spools vertically and seven spools in each transverse horizontal row so that the total number of spools is three times ten times seven or two hundred and ten (210). From the supply reels or spools 11, the wires 15 pass through a stationary guide or spacer plate 16, shown in front elevation in Figure 5 which contains a number of holes equal to the number of wires and so spaced that the wires issuing from the guide plate 16, will be in proper spaced relation to each other in a transverse horizontal direction, so that when the multiplicity of wires 15 is brought into a single horizontal plane, by the idle guide rolls or other suitable guide means 17 and 18, the wires will be immediately adjacent to each other in proper spaced relation. The multiplicity of wires 15 may then be passed directly through any suitable means 19 for the application thereto of a suitable adhesive or cohesive material. The adhesive applicator means 19, (not shown in detail) may be in the form of an applicator roll, the lower periphery of which dips into the fluid adhesive material, and the upper periphery of which applies the adhesive to the wires as they pass over the applicator roll in contact therewith, or the adhesive applicator means may consist of guide rolls which convey the wires directly beneath the surface of the liquid adhesive so as to dip the wires entirely in the adhesive, or the adhesive applicator means 19 may consist of any other suitable adhesive applicator means, such as spraying means which sprays the wires on one or both sides.

The adhesive employed is preferably an adhesive which dries or congeals or solidifies relatively quickly so that the wires will have had an opportunity to cohere or adhere to each other before the cutting and forming operation takes place. A convenient form of adhesive for this purpose is any one of the commercially known solutions of regenerated cellulose, a form of which is known commercially under the trade name of "collodium", although any other suitable quickly congealing or drying liquid adhesive may be employed.

The multiplicity of wires 15 are then fed through a series of feed rolls 20 and 21; 22 and 23; 24 and 25; 26 and 27; which are suitably journalled in any suitable and similar bearing blocks 28 at both ends of each roll. The pair of opposed feed rolls may be intermittently rotated to a suitable extent, by means of ratchet wheels 29, or by any other suitable means;—the rotation of all the feed rolls being in unison and being equal, and each pair of feed rolls being intergeared with each other by suitable gears 30 and 31. A ratchet arm 32 is pivotally mounted on the axis of either the top or bottom roll of each pair, as for instance, at 33, and carries any suitable pawl 34 for coaction with the corresponding ratchet wheel 29 whereby the rolls are positively actuated. The ratchet arms 32 are pivotally connected to a common connecting link 35, which in turn is reciprocated to and fro in timed relation with the cutting and punching operation, by means of the connecting rod 36, one end of which is pivotally secured to the link 35 at the point 37, and the other end of which is pivotally secured to the crank pin or any other suitable eccentric means 38 carried by the main shaft 39 of the wire cutting and punching means 40.

The diameters of the successive pairs of feeding rolls are slightly increased, as for instance, to the extent of a few thousandths of an inch for each successive pair of feed rolls, so that while the angle of rotation of each pair is equal for each stroke, the linear displacement of the peripheries of each of the successive pairs is slightly greater, thereby successively increasing the tension on the wires as they pass through the successive rolls.

The successive pairs of rolls are each in turn spaced more closely with respect to each other, so that as the multiplicity of wires pass through the successive rolls, they will be flattened slightly by the successive rolls. This slight flattening of the initially round wires has the tendency and effect of more closely spacing the wires with respect to each other, so that any slight gap between successive wires is taken up by this slight flattening and corresponding sidewise enlargement of the wires.

Suitable guide flanges may be provided on one or the other of each pair of rolls, or suitable stationary side guides may be provided intermediate of successive pairs of rolls, so as to prevent the end wires from leaving or separating from the rest of the wires while being fed through the rolls.

The cutting and forming operation may be performed by means of any suitable punch press type mechanism, such as that shown diagrammatically in Figures 1, 2 and 3, wherein a press head 41 is reciprocated vertically by means of the connecting rod 42, actuated by the eccentric 43 and the eccentric strap 44. The press head 41 carries the pair of opposed forming die members 45 and 46, which are adapted to coact with the lower stationary forming die or anvil 47 to form the wires into a U shape with downwardly depending legs, in a strip containing the full number of staples. Between the upper forming die members 45 and 46, a spring pressed and resiliently mounted pressure pad 48 is provided which will press down upon and tend to clamp the centers of the wires onto the top of the lower stationary anvil or forming die just prior to and during the forming operation, since the pressure pad 48 precedes the forming dies 45 and 46 by a suitable slight interval by reason of its spacing.

The outer edge 49 of the forming die member 45 is provided with a cutting edge as shown particularly in Figure 1 which is adapted to coact with the corresponding cutting edge 50 of the lower stationary cutting block or anvil 51;—the cutting edge 50 being preferably in alignment with the upper surface of the lower stationary forming die 47 and the upper periphery of the last lower feed roll 27. A spring-pressed clamp block 52 is also carried by the press head 41 for clamping the wires down onto the top surface of the cutter block 51, just prior to and during the cutting operation.

It will thus be seen that while the cutting and forming members 45 and 46, together with the spring-pressed pressure pads or clamping pads 48 and 52 move downwardly, first to clamp the wires beneath the pads 52 and 48 against the cutting block 51 and lower forming die 47, respectively, and then to cut the wires between the cutting edges 49 and 50, and immediately thereafter to form the cut wires into a U-shape around the lower stationary forming die 47;—the connecting rod 36 and the link 35 are moving rearwardly in the direction of the arrow 55, so as to ride the pawls 34 idly over one or more teeth of the ratchet wheels 29. When the die members 45 and 46 and the pressure pads 48 and 52 have lifted again sufficiently to clear the lower stationary members 47 and 51, the connecting rod 36 and the link 35 moves forwardly so as to turn the ratchet wheels 29 in unison and thereby to feed forward the multiplicity of wires to the predetermined extent for the next cutting and forming operation.

In order to remove each frozen strip of formed wire staples from the lower forming die 47, before the next strip is ready to be formed, any suitable automatic means may be provided for pushing the formed strip from the die 47. Thus, in Figures 2 and 3 I have illustrated diagrammatically one of the several ways in which this can be accomplished. Thus, the lower die 47 is provided with extensions 56 and 57 on either end, and a slide 58 of U-shaped cross section is slidably positioned on the extension 56. The slide 58, may be engaged by an arm 59, through the pin 60 carried by the slide and the slot 61 in the arm, in which said pin is adapted to ride. The upper end of the arm 59 may be pivoted as at 62, upon any stationary bracket 63. A suitable cam groove 64 may then be provided in the cylindrical face of the drum 65, carried upon the main shaft 39 of the press, and a suitable follower roll 66, carried by the arm 59, or otherwise suitably connected to the arm 59, is made to ride in the cam groove 64, so as to oscillate the arm 59 intermittently, and thereby to reciprocate the slide 58 intermittently. The reciprocation of the slide 58 is so timed by the appropriate formation of the cam groove 64 and its appropriate timing with relation to the press eccentric, that the formed strips of staples will be pushed to one side, onto the extension 57, before the new wire is fed out over the lower die 47 by the feed rolls.

The apparatus herein shown and described is merely diagrammatic, devoid of mechanical details and is intended merely to illustrate the manner in which my invention is to be practiced, without reference to the numerous details of mechanical construction in apparatus.

So too, while I have shown the adhesive applicator means 19 as being disposed between the wire guide 16 and the first set of feed rolls, it is to be understood that the adhesive applicator means may also be disposed between successive pairs of feed rolls. Just at which stage in the progress of the wires the adhesive is applied, may depend upon the character of the adhesive, and the rapidity with which it congeals, and may depend on other factors;—the essential feature being merely that the adhesive or cohesive material be applied to the multiplicity of wires before the same are formed.

By my novel method also, not only is the production of frozen strips of wire staples greatly facilitated and made more accurate as to the resultant product, but, the resultant product is susceptible, by reason of my novel process or method, of being variously ornamented or marked by suitable markings, such as trade marks or the like. Thus, by reason of the manner of adhesion, and the manner of formation of the staples, an embossing surface may be provided on the bottom of the press pad 48, so that any desired ornamentation or trade mark or the like may be pressed into the unitarily formed strip of staples.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description, to indicate the scope of the invention.

In the preferred embodiment of my invention I apply the cohesive material only to one side of the multiplicity of wires, and preferably to the under side thereof, so that the cohesive material will only be on the inside of the strip of cohered staples. This may best be accomplished by passing the multiplicity of wires over the top of an applicator roll, the lower periphery of which dips into a pool of the cohesive or adhesive material in the fluid condition.

Having thus described my invention, what I hereby claim as new and desire to secure by Letters Patent, is:—

1. The method of unitarily forming frozen strips of wire staples which consists in simultaneously feeding a multiplicity of wires from a corresponding multiplicity of divergent sources of supply, guiding said multiplicity of wires into a single plane and into contiguous and parallel relation to each other, intermittently propelling said multiplicity of wires in relation to wire cutting and forming means, a linear distance generally corresponding to the aggregate length of all the parts of the desired staple, cutting from the free ends of said multiplicity of wires an amount generally equal to the aggregate length of all the parts of the desired staple, simultaneously forming said multiplicity of cut wires into a corresponding multiplicity of contiguously disposed staples, and causing the adhesion of adjacent wires to each other, so that the resultant product will comprise a multiplicity of adjacent and contiguous wire staples cohered into a single strip.

2. The method of unitarily forming cohered strips of wire staples which consists in simultaneously feeding a multiplicity of wires from a corresponding multiplicity of divergent sources of supply, bringing said multiplicity of wires into a single plane and into contiguous and parallel relation to each other, intermittently propelling said multiplicity of wires in relation to wire cutting and forming means a linear distance generally corresponding to the aggregate length of all the parts of the desired staple, cutting the free ends of said multiplicity of wires an amount generally equal to the aggregate length of all the parts of the desired staple, simultaneously forming said multiplicity of cut wires into a corresponding multiplicity of contiguously disposed staples and applying a cohesive material to the said wires prior to the forming thereof into the staples, thereby causing the cohering of the adjacent staples to each other, so that the resultant product will comprise a multiplicity of adjacent and generally contiguous wire staples cohered into a single strip.

3. The method of unitarily forming cohered strips of wire staples, which consists in simultaneously feeding a multiplicity of wires from a corresponding multiplicity of divergent sources of supply, bringing said multiplicity of wires into parallel adjacent relation to each other, intermittently propelling said multiplicity of wires in relation to wire cutting and forming means a linear distance generally corresponding to the aggregate length of all the parts of the desired staple, cutting the free ends of said multiplicity of wires an amount generally equal to the aggregate length of all the parts of the desired staple, simultaneously forming said multiplicity of cut wires into a corresponding multiplicity of parallel adjacent staples and applying a cohesive material to the side of said wires which constitutes the inner sides of the staples, thereby causing cohesion of the adjacent wires to each other, so that the resultant product will comprise a multiplicity of adjacent and generally contiguous wire staples cohered into a single strip.

4. The method of unitarily forming cohered strips of wire staples, which consists in simultaneously feeding a multiplicity of wires from a corresponding multiplicity of sources of supply, bringing said multiplicity of wires into parallel adjacent relation to each other, applying a cohesive material generally to one side of said multiplicity of said wires, intermittently propelling said multiplicity of wires in relation to wire cutting and forming means, cutting the free ends of said multiplicity of wires, and simultaneously forming said multiplicity of cut wires into a corresponding multiplicity of parallel and adjacently disposed staples with the cohesive material disposed generally on the inside of the staples, thereby producing a cohered strip of wire staples.

5. The method of forming wire staples and the like which consists in simultaneously feeding a multiplicity of wires from a corresponding multiplicity of sources of supply, bringing said multiplicity of wires into parallel and adjacent relation to each other, intermittently propelling said multiplicity of wires in relation to wire cutting and forming means, and tensioning said wires by said propelling action, cutting the free ends of said multiplicity of wires, and simultaneously forming said multiplicity of cut wires into a corresponding multiplicity of parallel and adjacently disposed staples or the like.

6. The method of forming wire staples and the like which consists in simultaneously feeding a multiplicity of wires from a corresponding multiplicity of sources of supply, bringing said multiplicity of wires into parallel and adjacent relation to each other, intermittently propelling said multiplicity of wires in relation to wire cutting and forming means, and tensioning said wires by said propelling action, cutting the free ends of said multiplicity of wires, simultaneously forming said multiplicity of cut wires into a corresponding multiplicity of parallel and adjacently disposed staples or the like, and applying a cohesive material to said multiplicity of wires prior to the forming operation, thereby to cause the cohesion of the adjacent wires after the formation thereof so that the resultant product will comprise a multiplicity of adjacent and parallel wire staples or other similar formed wire devices, cohered into a single strip.

7. The method of forming a multiplicity of wires into one contiguous and cohered series of staple-forming members, which consists in simultaneously feeding a multiplicity of wires from a corresponding multiplicity of divergent sources of supply, guiding said multiplicity of wires into contiguous and parallel relation to each other and applying to the contiguous and parallel wires a quickly-setting non-metallic adhesive fluid for causing the adhesion of adjacent wires to each other, severing a predetermined length of the thus cohered sheet of wires, and bending the same.

8. The method of forming a multiplicity of wires into a cohered strip of fastening devices, which consists in simultaneously feeding a multiplicity of wires from a corresponding multiplicity of divergent sources of supply, by intermittent propulsion, guiding said multiplicity of wires into contiguous and parallel relation to each other and applying to the contiguous and parallel wires, a quickly-setting non-metallic adhesive fluid for causing the adhesion of adjacent wires to each other, and cutting predetermined lengths of the thus cohered sheet of wires, and forming the same into a strip of fastening devices, each of said devices having a central portion and two depending leg portions.

9. The method of forming frozen strips of wire staples, which consists in simultaneously feeding a multiplicity of wires from a corresponding multiplicity of divergent sources of supply toward a cutting and bending means, applying adhesive to said wires and bringing them into contiguous relation in a single plane, shearing said wires and forming them to produce a channel-shaped group of staples, and moving said group away from the position in which it was formed in the direction of the axis of the channel of the group.

10. The method of unitarily forming frozen strips of wire staples which consists in simultaneously feeding a multiplicity of wires from a corresponding multiplicity of divergent sources of supply, guiding said multiplicity of wires toward a cutting and forming means, applying adhesive to said wires and bringing them into contiguous relation in a single plane, intermittently propelling said multiplicity of wires in relation to a wire cutting and forming means, shearing and forming the wires to produce a channel-shaped group of staples, and moving said group away from the position in which it was formed in the direction of the axis of the group.

11. In the method of unitarily forming frozen strips of wire staples which consists in simultaneously feeding a multiplicity of wires from a corresponding multiplicity of divergent sources of supply, guiding said multiplicity of wires into a single plane and into contiguous and parallel relation to each other, feeding said multiplicity of wires toward a wire cutting and forming means, and increasing the tension on said wires as they move toward said means.

12. In the method of unitarily forming frozen strips of wire staples which consists in simultaneously feeding a multiplicity of wires from a corresponding multiplicity of divergent sources of supply, guiding said multiplicity of wires into a single plane and into contiguous and parallel relation to each other, intermittently propelling said multiplicity of wires toward a wire cutting and forming means, and flattening said wires as they move toward said means.

13. In the method of making frozen wire staples, the steps of feeding a multiplicity of wires from separate sources of supply in parallel and contiguous relation to each other, tensioning said wires while in such parallel and contiguous relation to each other, and applying a cohesive material to said wires in the tensioned zone thereof, for uniting said wires into a sheet.

14. In the process of making frozen wire staples, the steps of simultaneously feeding a multiplicity of wires from a multiplicity of sources of supply into contiguous and parallel relation to each other to form a sheet-like arrangement, applying a cohesive material to said sheet of contiguous wires while the same are in motion, and tensioning said sheet of contiguous wires in the zone of the application of the cohesive materials.

15. In the method of making frozen wire staples, the steps of feeding a multiplicity of wires from separate sources of supply into parallel and contiguous relation to each other, tensioning said wires while in such parallel and contiguous relation to each other, applying a cohesive material to said wires in the tensioned zone thereof, for uniting said wires into a sheet, and severing predetermined lengths of said wires after the application of the cohesive material thereto.

16. In the process of making frozen wire staples, the steps of simultaneously feeding a multiplicity of wires from a multiplicity of sources of supply to contiguous and parallel relation to each other to form a sheet-like arrangement, applying a cohesive material to said sheet of contiguous wires while the same are in motion, tensioning said sheet of contiguous wires in the zone of the application of the cohesive materials, and severing predetermined lengths of said cohered sheet.

RUDOLPH E. ZERUNEITH.